(12) United States Patent
Kodali et al.

(10) Patent No.: US 11,317,473 B2
(45) Date of Patent: Apr. 26, 2022

(54) DEVICE-CAPABILITY-BASED AND STANDALONE PAGING IN NEW RADIO UNLICENSED BAND

(71) Applicant: Apple Inc., Cupertino, CA (US)

(72) Inventors: Sree Ram Kodali, Sunnyvale, CA (US); Sethuraman Gurumoorthy, San Jose, CA (US); Murtaza A. Shikari, Mountain View, CA (US); Haijing Hu, Beijing (CN); Srinivasan Nimmala, San Jose, CA (US); Yuqin Chen, Shenzhen (CN); Xu Ou, San Jose, CA (US); Longda Xing, San Jose, CA (US); Srirang A. Lovlekar, Cupertino, CA (US); Fangli Xu, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 16/478,951

(22) PCT Filed: Aug. 3, 2018

(86) PCT No.: PCT/CN2018/098584
§ 371 (c)(1),
(2) Date: Jul. 18, 2019

(87) PCT Pub. No.: WO2020/024278
PCT Pub. Date: Feb. 6, 2020

(65) Prior Publication Data
US 2021/0345455 A1 Nov. 4, 2021

(51) Int. Cl.
H04W 88/18 (2009.01)
H04W 52/02 (2009.01)
H04W 68/00 (2009.01)

(52) U.S. Cl.
CPC ..... H04W 88/184 (2013.01); H04W 52/0241 (2013.01); H04W 68/005 (2013.01)

(58) Field of Classification Search
CPC ........... H04W 88/184; H04W 52/0241; H04W 68/005
(Continued)

(56) References Cited

U.S. PATENT DOCUMENTS

2015/0109981 A1 4/2015 Patil
2016/0270027 A1 9/2016 Ang
(Continued)

FOREIGN PATENT DOCUMENTS

CN 103379593 A 10/2013
CN 106852194 A 6/2017
(Continued)

OTHER PUBLICATIONS

Extended European Search Report for Application No. 18901812.0-1212, dated Dec. 26, 2020, 13 pages.
(Continued)

Primary Examiner — Nghi H Ly
(74) Attorney, Agent, or Firm — Kowert, Hood, Munyon, Rankin & Goetzel, P.C.

(57) ABSTRACT

A device may operate within a specified frequency band within a specified coverage area of a wireless cellular network served by a cell. The device may monitor, during a cell-specific paging window, paging messages transmitted by the cell within the cell-specific paging window to devices operating within the specified coverage area and targeted to receive paging messages. The device may enter an idle state if the monitoring indicates that the paging messages do not include a respective paging message intended for the device. If the monitoring indicates that the paging messages include a paging message intended for the device, the device may
(Continued)

process the paging message. Furthermore, the device may indicate to the cell, when attaching to the cell, whether the device has a capability to support standalone operation within the specified frequency band. If the indication is that the device does not support such standalone operation, the cell may not issue paging messages to the device.

20 Claims, 11 Drawing Sheets

(58) Field of Classification Search
USPC ............... 370/329, 328, 338, 341, 345, 350
See application file for complete search history.

(56) References Cited

U.S. PATENT DOCUMENTS

| | | | |
|---|---|---|---|
| 2017/0111886 | A1 | 4/2017 | Kim et al. |
| 2017/0265136 | A1 | 9/2017 | Elsayed et al. |
| 2018/0007682 | A1* | 1/2018 | Takeda ................. H04W 28/06 |
| 2018/0049156 | A1 | 2/2018 | Laha |
| 2020/0169446 | A1* | 5/2020 | Chen ..................... H04L 5/0048 |

FOREIGN PATENT DOCUMENTS

| | | |
|---|---|---|
| CN | 106961729 A | 7/2017 |
| CN | 107409377 A | 11/2017 |
| CN | 107925985 A | 4/2018 |
| JP | 2012-510773 A | 5/2012 |
| JP | 2013-520100 A | 5/2013 |
| KR | 10-2008-0110554 | 12/2008 |
| KR | 10-2017-0047232 | 5/2017 |
| WO | 2017/166313 A1 | 10/2017 |
| WO | 2018025946 A1 | 8/2018 |

OTHER PUBLICATIONS

"Paging Transmission on NR-U", 3GPP TSG RAN WG1 Meeting #93; R1-1806855, May 21-25, 2018; 3 pages.

Apple, Considerations on NR-U Paging, 3GPP TSG-RAN WG2 Meeting #103, R2-1812699, 3 pages.

"Paging Enhancement for NR-U" Intel Corporation; R2-1809805; Jul. 2-6, 2018; 4 pages.

"Offline Summary for AI 7.1.1.3 on Paging" Huawei, HiSilicon; R1-1805679; Apr. 16-20, 2018; 10 pages.

"UE Capability Signaling Framework for NR" Intel Corporation; R2-1700323; Jan. 17-19, 2017; 9 pages.

Nokia et al., R2-1810210, Paging operation in unlicensed spectrum, 3GPP TSG RAN WG2 #AHS (3GPP server release date: Jun. 21, 2018), 3GPP TSG-RAN WG2 Meeting #AH-1807, Montreal, Canada, 2nd-th Jul. 2018, two pages.

Catt et al., R2-1706390, Consideration on NR static UE capability, 3GPP TSG RAN WG2 #AHS (3GPP server release date: Jun. 16, 2017), 3GPP TSG-RAN WG2 Meeting #NR-AH2, Qingdao, China, Jun. 27-29, 2017, three pages.

Korean Office Action from Application No. 10-2019-7022437, dated Jun. 25, 2020, includes English Translation, nine pages.

First Examination Report for IN Application No. 201917031228, dated Jan. 29, 2021, 7 pages.

First Office Action for Chinese Office Patent Application No. CN 201880009112.X; dated Jan. 6, 2022.

* cited by examiner

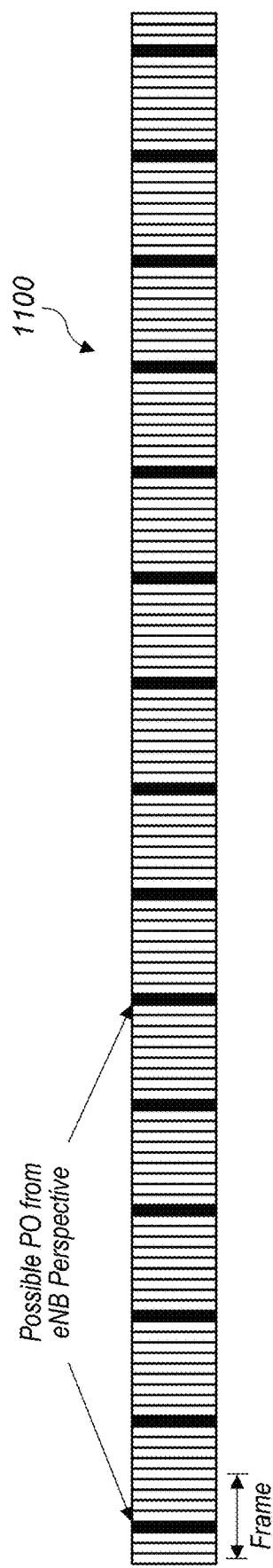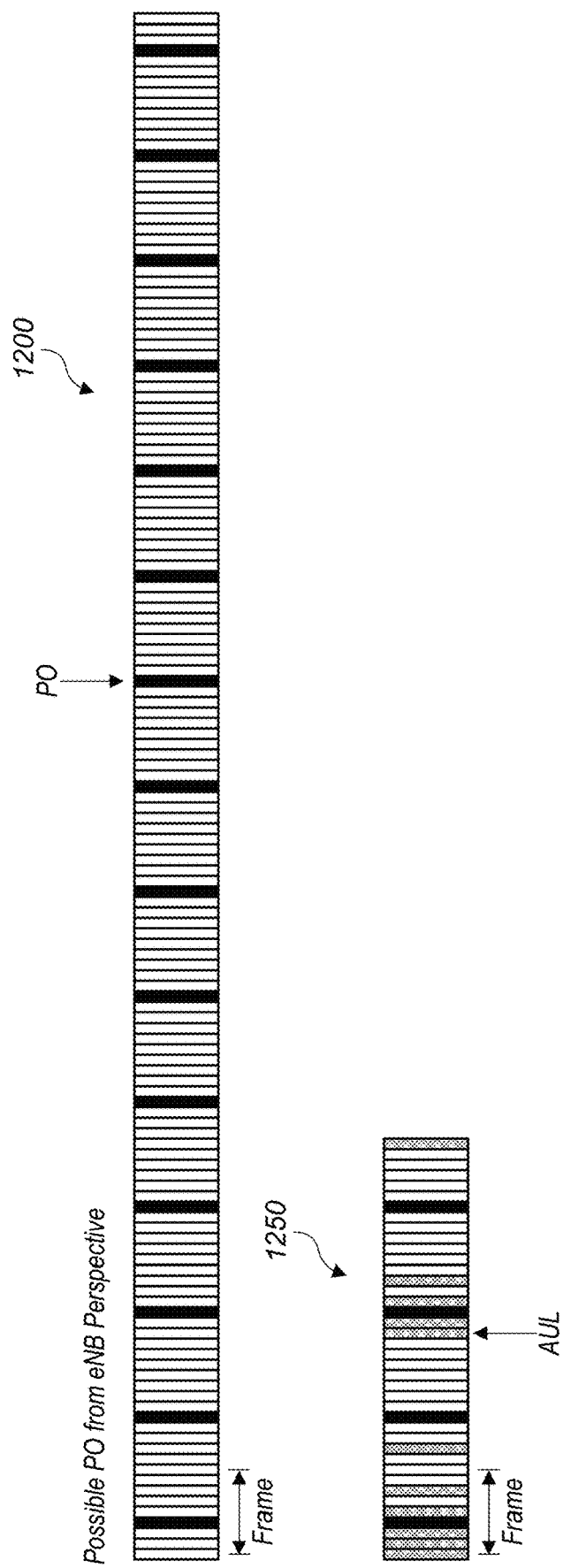
FIG. 11
FIG. 12

DEVICE-CAPABILITY-BASED AND STANDALONE PAGING IN NEW RADIO UNLICENSED BAND

FIELD OF THE INVENTION

The present application relates to wireless communications, and more particularly to providing device-capability-based and standalone paging support in New Radio Unlicensed Band (NR-U).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH', etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices are generally powered by a portable power supply, e.g., a battery. There are ongoing efforts not only to reduce power consumption required to perform wireless communications in order to improve the battery life of wireless devices, but also to achieve efficient use of wireless communication resources and thereby increase system efficiency. However, increasing the functionality of a UE, for example adding functionality for NR and/or NR Unlicensed Spectrum (NR-U) deployment, can significantly affect system and device operations. It is therefore desirable to provide appropriate support for NR and/or NR-U deployment for UEs.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for novel paging mechanisms and procedures in various devices, e.g. wireless communication devices. The novel paging mechanisms may provide support for the deployment and use of those devices in New Radio (NR) and/or NR Unlicensed Spectrum (NR-U) networks, among others. Embodiments are further presented herein for wireless communication systems containing wireless communication devices (UEs) and/or base stations and access points (APs) communicating with each other within the wireless communication systems.

In some embodiments, a device, e.g. a wireless communication device (UE) may operate according to a specified radio access technology, e.g. NR (or NR-5G) within a specified frequency band (e.g. within an unlicensed band, NR-U) and within a specified coverage area of a wireless cellular network served by a cell (e.g. a base station, gNB associated with the cell). The device may monitor, during a cell-specific paging window, for paging messages transmitted by the cell within the cell-specific paging window. The cell may transmit the paging messages during the cell-specific paging window to all devices operating within the specified coverage area that are targeted (or are intended) to receive paging messages. In other words, the cell may transmit paging messages during the cell-specific paging window to all devices which are intended to receive paging messages and are operating within the specified coverage area of the cell. The device may enter a sleep mode if the monitoring indicates that the paging messages do not include a respective paging message intended for the device. If the monitoring indicates that the paging messages include a paging message intended for the device, the device may process the paging message intended for the device. In some embodiments, the device may indicate to the cell, during early communications with the cell, e.g. when attaching to the cell and/or at a later time, e.g. in response to a network inquiry, whether the device has the capability to support standalone operation within the specified frequency band. For example, the device may indicate to the cell (or to the network) whether it has the capability to support standalone NR-U operation. If the indication is that the device does not support such standalone operation, the cell may not include paging messages targeting (or intended for) the device among paging messages transmitted by the cell, e.g. among the paging messages transmitted by the cell during the cell-specific paging window. In this manner, the cell does not transmit unnecessary or unneeded paging messages, thereby further improving efficiency of the use of system resources.

In some embodiments, the device may further receive from the cell an indication that no paging messages for the device will be transmitted by the cell within a given transmission cycle, e.g. within a DRX cycle. The device may then enter an idle state in response to receiving the indication from the cell. The device may receive this indication through an empty paging message and/or specific downlink control information. The device may also receive an end-of-paging (EOP) message from the cell, with the EOP message indicating that the cell has stopped transmitting paging messages within the given transmission cycle, e.g. within the DRX cycle, and the device may enter an idle state in response to receiving the EOP message.

Because paging messages may be transmitted by the cell to multiple devices during the cell-specific paging window, there may be devices that receive paging messages during the same time period, and the chance for random access collisions may increase if more than one device receives a paging message in a given transmission cycle, e.g. in a DRX cycle. In order to reduce and/or eliminate such random access collisions, the device may obtain a random time value, start a timer based on the random time value, and may not initiate a random access channel (RACH) procedure until the timer has expired. That is, the device may start the timer and wait until a time period of specified length defined by the obtained random time value has elapsed before initiating a RACH procedure. The device may start the timer after the cell-specific paging window ends, or after receiving a paging message intended for the device (the monitoring of paging messages would indicate the presence of such paging message).

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 11 shows a diagram illustrating possible paging occasions from the perspective of the network node;

FIG. 12 shows diagrams illustrating possible paging occasions from the perspective of the network node and its effect on the assignment of an autonomous uplink scheduling bit mask;

Figure 1:
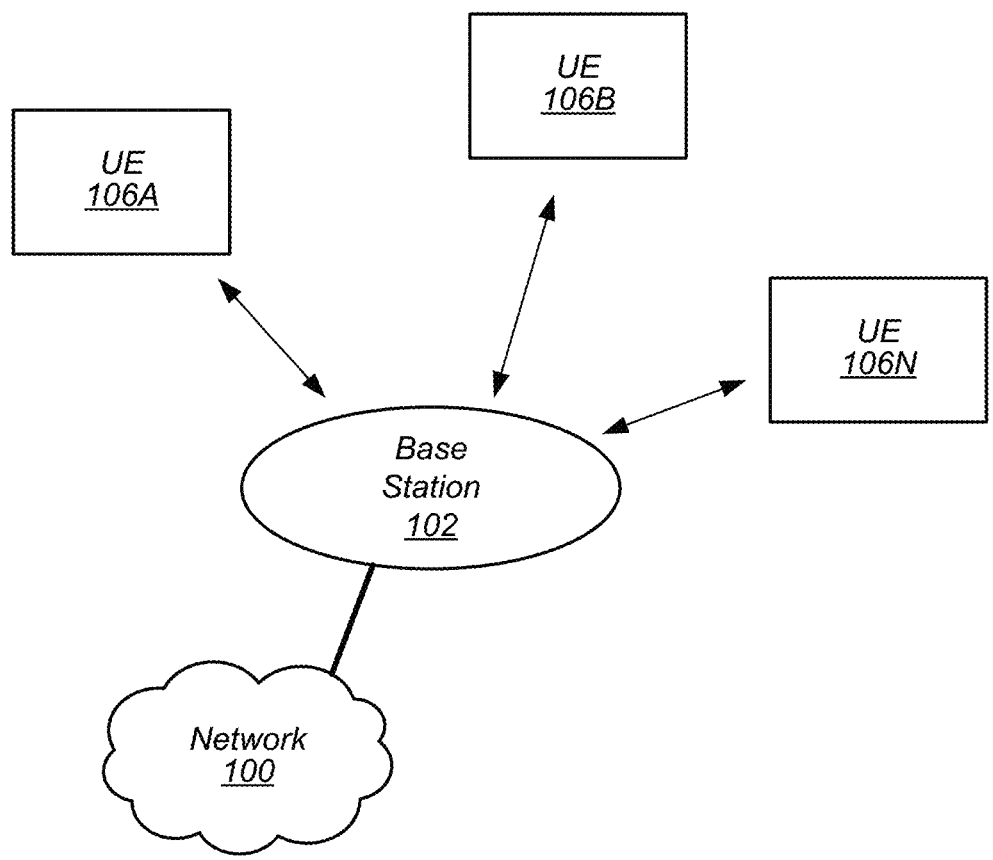
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMF: Access and Mobility Management Function
AMR: Adaptive Multi-Rate
AP: Access Point
APN: Access Point Name
APR: Applications Processor
AUL: Autonomous Uplink Transmission(s)
BS: Base Station
BSR: Buffer Size Report
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DCI: Downlink Control Information
DL: Downlink (from BS to UE)
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IMSI: International Mobile Subscriber Identity
IP: Internet Protocol
IR: Initialization and Refresh state
KPI: Key Performance Indicator
LAN: Local Area Network LBT: Listen Before Talk
LQM: Link Quality Metric
LTE: Long Term Evolution
MNO: Mobile Network Operator
NAS: Non-Access Stratum
NB: Narrowband
NG-RAN: Next Generation Radio Access Network
NR: New Radio
NR-U: New Radio Unlicensed Spectrum
OOS: Out of Sync
PAL: Priority Access License
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAN: Radio Access Network
RAT: Radio Access Technology
RF: Radio Frequency
RNA: RAN-based Notification Area
RNTI: Radio Network Temporary Identifier
ROHC: Robust Header Compression
RTP: Real-time Transport Protocol
RTT: Round Trip Time
RX: Reception/Receive
SAS: Spectrum Allocation Server
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX: Transmission/Transmit
UE: User Equipment
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
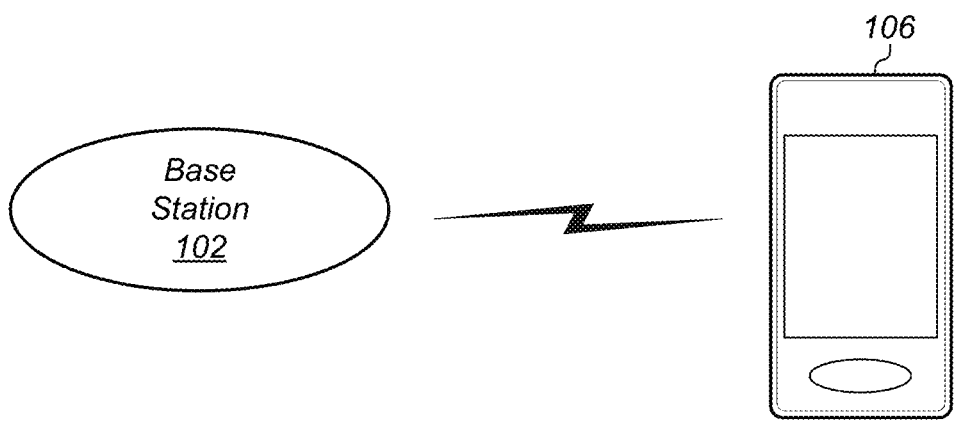
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106 are referred to as UEs or UE devices. Various ones of the UE devices may operate to implement paging procedures for standalone NR-U operation according to various embodiments disclosed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, neutral host or various CBRS deployments, among various possibilities). Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. In some embodiments, the base station 102 communicates with at least one UE having the capability to implement paging procedures for standalone NR-U operations as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE and/or NR communications may be performed over a primary licensed spectrum as well as over an unlicensed spectrum. Overall, the use of various terms and expressions will always be clearly indicated with respect to and within the context of the various applications/embodiments under consideration.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
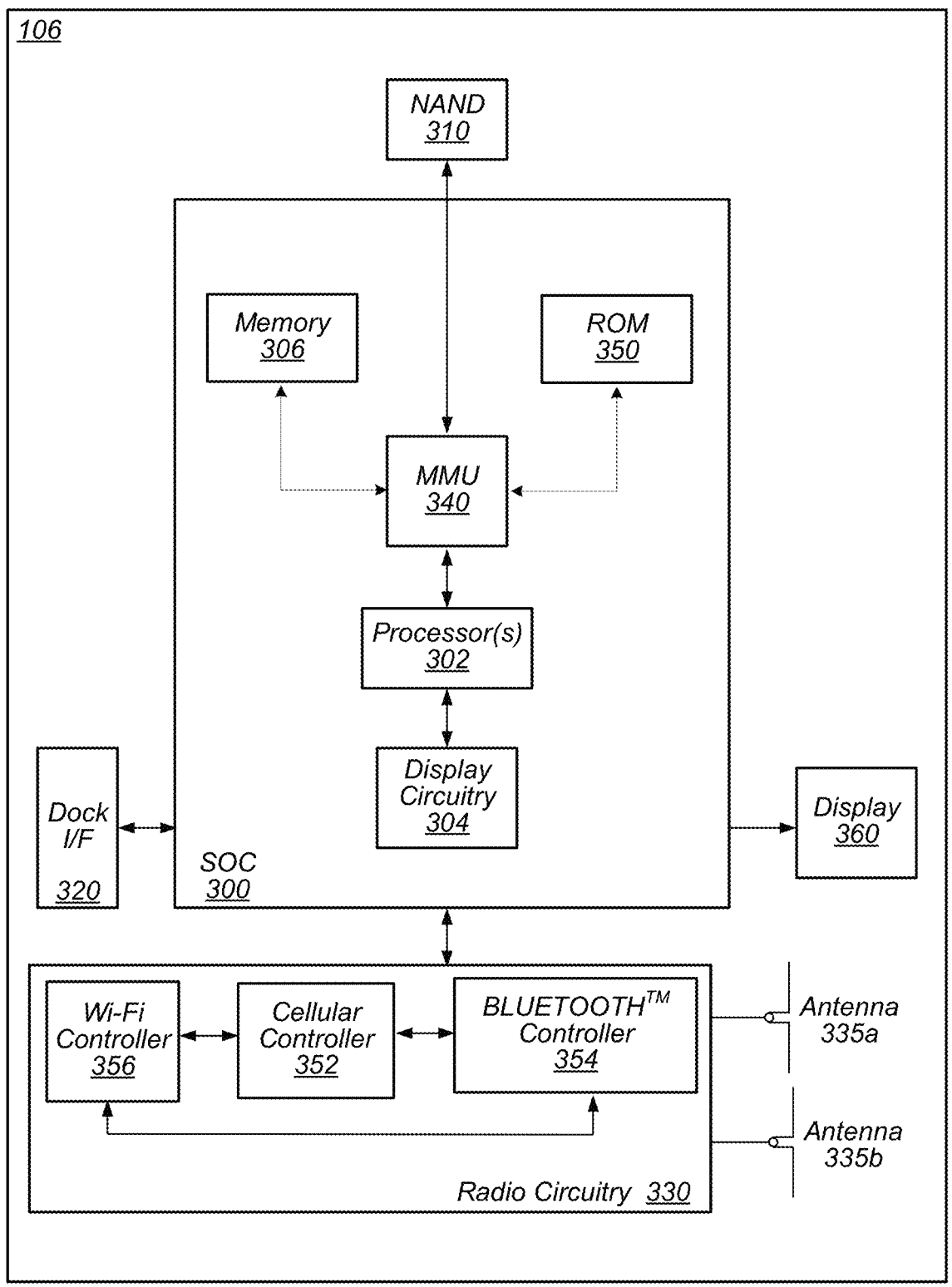
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to implement paging procedures for standalone NR-U operation as further detailed herein. Thus, in some embodiments, UE 106 may support standalone NR-U operations and may implement paging procedures that may improve system performance with respect to paging for UEs that support standalone NR-U operations. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement paging procedures for standalone NR-U operation according to various embodiments disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH' controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH' controller 354 may communicate with cellular controller 352 over a cell-ISM link, etc. While three separate controllers are illustrated within radio circuitry 330, other embodiments have fewer or more similar controllers for various different RATs that may be implemented in UE device 106.

Figure 4:
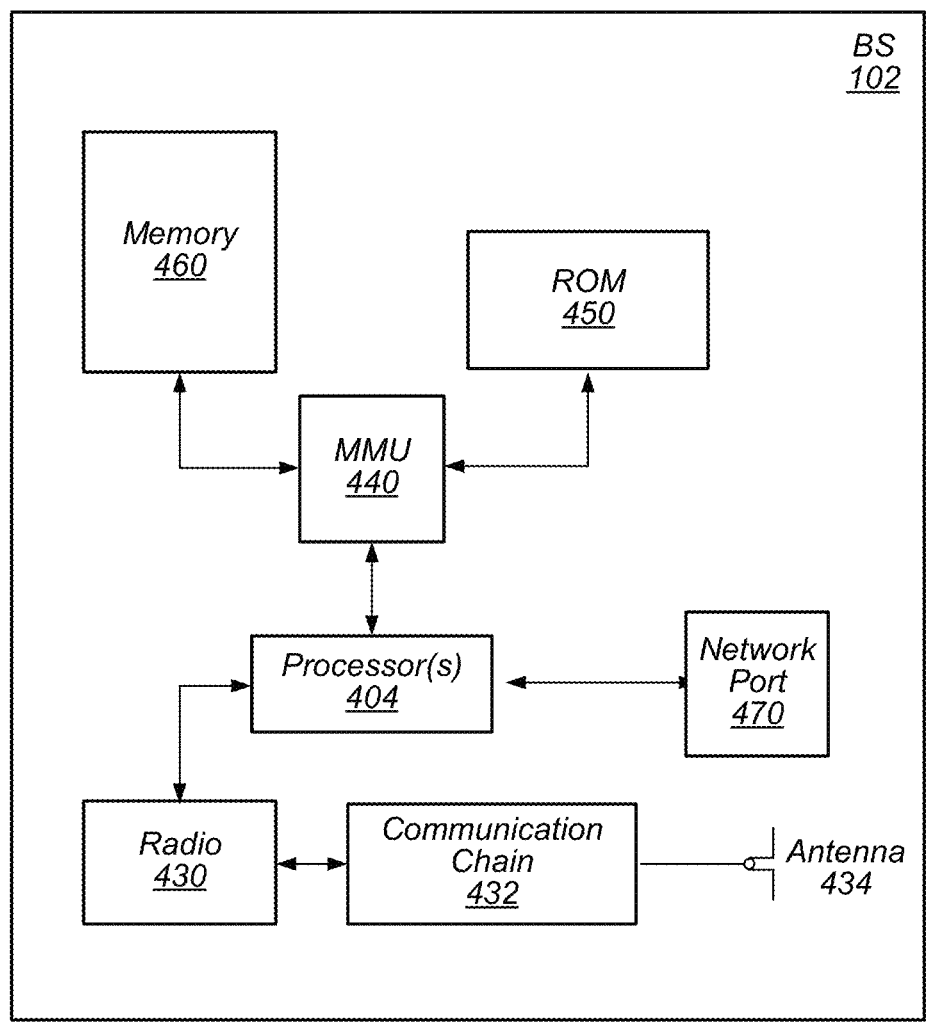
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to implement paging procedures for standalone NR-U operation. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for implementing paging procedures for standalone NR-U operation to transmit paging messages to UE devices that support standalone NR-U operations, according to various embodiments described herein.

DRX Communications and Physical Channels

One power saving technique developed to save power in transceiver circuitry is known as discontinuous reception (or DRX). In devices utilizing DRX, portions of wireless circuitry may be powered down if there is no information (e.g., packets) to be received or transmitted. The wireless circuitry may periodically be powered on to determine if there is information to be received, and subsequently powered back down again if such a determination indicates that no new information is incoming. A device utilizing DRX may determine from a header in a transmitted packet if the information contained therein is incoming for that device. If the information is not relevant to that device, then circuitry may be powered down for at least a portion of the remainder of the packet, and subsequently powered on before the next header. Polling is another technique that may be used, wherein a device may periodically send a beacon to an access point or base station to determine if there is any information waiting for reception. If no information is awaiting reception, portions of the wireless circuitry may be powered down until the next beacon is to be transmitted. In addition to determining if information is awaiting reception by the mobile device, neighbor cell searching may be conducted during the time when the wireless circuitry is powered up while operating in a DRX mode. Neighbor cell searching may be performed in order to enable cell reselection and handover of the mobile device from one cell to another.

In general, DRX has been introduced in several wireless standards such as UMTS (Universal Mobile Telecommunications System), LTE (Long-term evolution), New Radio (NR or NR-5G), WiMAX, etc., which powers down most of user equipment (UE) circuitry when there are no packets to be received or transmitted, and only wakes up at specified times or intervals to listen to the network. DRX can be enabled in different network connection states, including connected mode and idle mode. In connected DRX (C-DRX) mode, the UE listens to the downlink (DL) packets following a specified pattern determined by the base-station (BS). In idle DRX (I-DRX) mode, the UE listens to the page from the BS to determine if it needs to reenter the network and acquire the uplink (UL) timing. Because DRX allows the UE to switch off its transceiver circuitry for short intervals when there is no data to receive or transmit, and start "wake up and sleep" cycles to check whether there is data to send or receive, operating in C-DRX mode helps decrease battery usage.

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Paging in Cellular Communications

Paging in cellular communications is mostly a radio resource control (RRC) procedure to wake up a UE if there is data intended for that UE. A UE (which may have entered an RRC idle state) may need to be awakened for multiple reasons, such as downlink data, change of system information or even to switch access to a different cellular radio access technology (RAT). A UE is typically informed about the paging cycle during the initial attach process as part of the system information (SIB2). Once the UE is aware about the paging cycle, it momentarily wakes up during the onset of the paging cycle, checks for paging messages, then returns to an idle state if no paging messages for the UE are detected. If a paging message for the UE is detected, the UE triggers an RRC connection establishment request message.

In some cellular communications, e.g. in LTE and NR communications, RNTIs (Radio Network Temporary Identifiers) are used to differentiate/identify a connected mode UE in the cell, a specific radio channel, a group of UEs in case of paging, a group of UEs for which power control is issued by the eNB/gNB, system information transmitted for all the UEs by the eNB/gNB, etc. There are a several RNTI types, one of which is Paging RNTI (P-RNTI), which is used by the UEs for the reception of paging. P-RNTI is a common RNTI meaning that it is not allocated to any UE explicitly. A paging message is typically carried by the PDCCH channel which is mapped to PCH transport channel, which is mapped to the PDSCH channel. The DCI (Downlink Control Information) formats which carry the scheduling information for paging are DCI-1A and DCI-1C in common search space.

Furthermore, a unique International Mobile Subscriber Identity (IMSI) is typically allocated to each mobile subscriber. In order to support the subscriber identity confidentiality service, a Temporary Mobile Subscriber Identity (T-IMSI) may be allocated to visiting mobile subscribers. The VLR (Visitor Location Register), SGSN (Serving General packet radio service Support Node) and MME (Mobile Management Entity) have be capable of correlating an allocated T-IMSI with the IMSI of the UE to which the T-IMSI is allocated.

When in I-DRX mode, the wireless communication device (UE) periodically wakes up to check for paging. When checking for paging, the UE may perform the following activities, among others:

Decode the PDCCH
If a P-RNTI is identified as a result of decoding the PDCCH, then decode the PDSCH
Check for the UE's T-IMSI in the Page message:
If no T-IMSI is identified, then enter DRX off-period
If the T-IMSI is identified, then start RRC connection procedure.

The above sequence may be performed with minimum system resources, i.e. with minimum use of memories, cores, busses, etc. In this context system resources for a specific function/sequence generally refer to any hardware and/or software resource required to perform the specific function/sequence. In case of "No paging", i.e. in case either no P-RNTI and/or no T-IMSI has been detected/identified, the system may continue to operate with the minimum system resources. For example, the decoding of PDCCH takes a specified amount of time, which in some cases may be approximately 200 μsec. If no P-RNTI is found for the UE, then the UE may enter a "sleep mode" where minimal system resources are used. If a P-RNTI for the UE is found, then it may take approximately another 700 μsec to decode PDSCH. If no T-IMSI for the UE is found, the UE may then enter the "sleep mode". However, if it is determined that the UE is being paged (P-RNTI and T-IMSI for the UE have both been identified through the decoding), then the UE switches to operating with full system resources.

Paging in NR-U

In addition to the major communication standards such as LTE and NR, there also exist extensions aimed at boosting transmission coverage in certain cellular networks. For example, LTE in unlicensed spectrum (LTE-U) and NR in unlicensed spectrum (NR-U) allow cellphone carriers to boost coverage in their cellular networks by transmitting in the unlicensed 5 GHz band which is also used by many Wi-Fi devices. License Assisted Access (LAA) describes a similar technology aimed to standardize operation of LTE and NR in the Wi-Fi bands through the use of a contention protocol referred to as listen-before-talk (LBT), which facilitates coexistence with other Wi-Fi devices on the same band.

In order to make devices more versatile, support for standalone NR-U deployment of UEs has been proposed. One important feature to consider for standalone NR deployment of UEs in the unlicensed spectrum is paging and paging message delivery on the NR-U spectrum. In some embodiments, based on UE capability, UEs may be divided into two categories, a first category indicative of UEs supporting standalone NR-U operation and a second category indicative of UEs not supporting standalone NR-U operation. In other words, a UE may be capable or non-capable of camping on an NR-U cell. Currently, the core network and base stations (e.g. gNBs) have no information indicating whether a UE is capable of camping on an NR-U standalone cell. In an NR network, it is unnecessary to page a UE that is not capable of camping on NR-U cell. Delivery of paging messages to such UEs on an NR-U spectrum reduces the utilization efficiency of NR-U resources. In addition, it may considerably increase the loading of the NR-U spectrum, leading to a low probability of successful LBT checks.

UE Capability Based Paging

Figure 5:
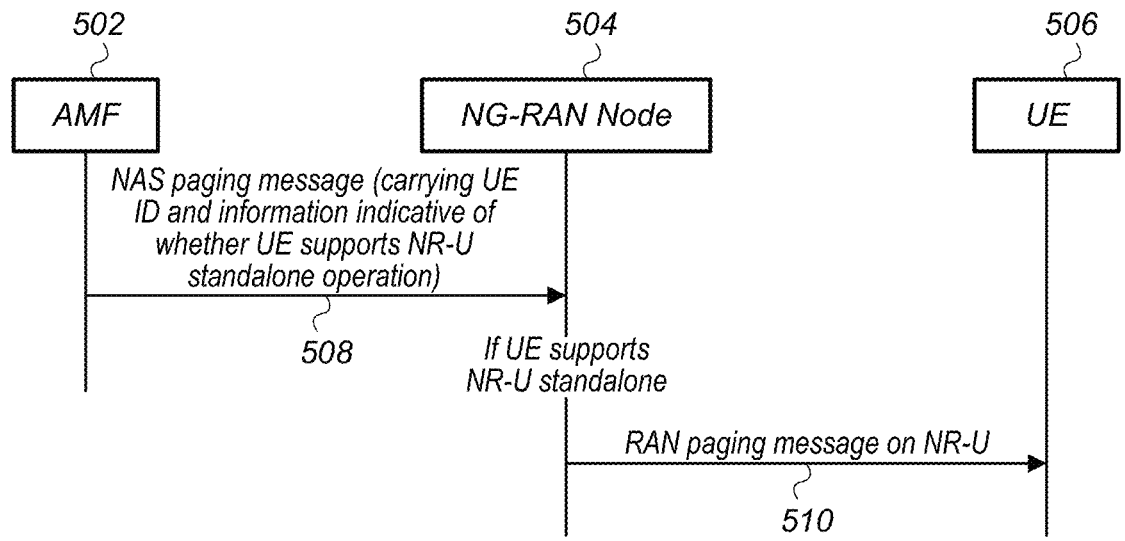
FIG. 5 shows a signal timing diagram illustrating transmission, from an AMF, of a paging message that includes an indication of device capability for NR-U support, according to some embodiments.

In order to support UE deployment in NR-U with efficient paging, a device capability based paging mechanism may be implemented. Accordingly, in some embodiments, the core network (more specifically, the core Access and Mobility Management Function, AMF) may store UE capability information indicative of whether the UE supports NR-U standalone cell operations. The core network may indicate the UE capability to one or more nodes within the network as part of a Non-Access Stratum (NAS) paging message. As illustrated in FIG. 5, AMF 502 may transmit (at 508) a NAS paging message (carrying UE ID and information indicative of whether UE supports NR-U standalone operation) to a node 504 (which may be a Next Generation Radio Access Network, NG-RAN, base station, e.g. a gNB). Transmission of the paging messages between AMF 502 and node 504 may take place over an interconnecting interface established between the RAN and the evolved packet core, e.g. over the NG-C interface. If the UE supports NR-U standalone cell operation, the node 504 may transmit (at 510) the paging message over the NR-U spectrum to a UE 506. Otherwise, node 504 may not transmit the paging message over the NR-U spectrum.

Figure 6:
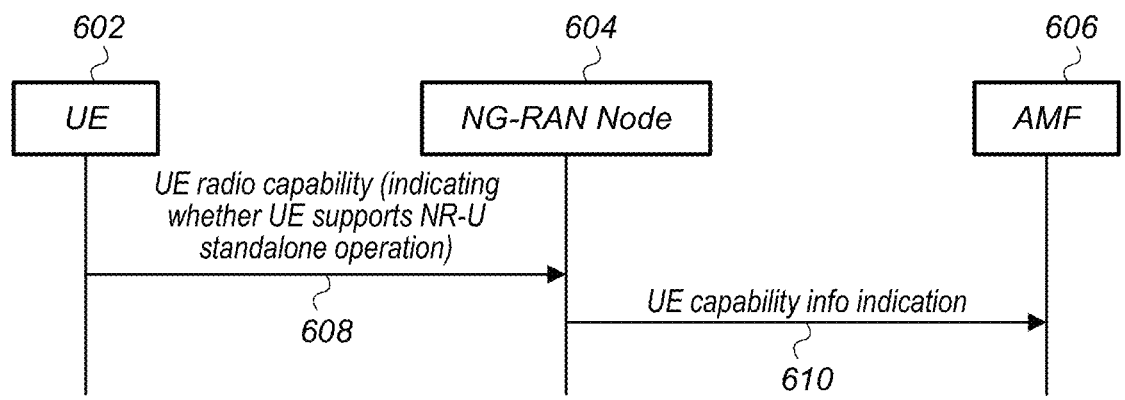
FIG. 6 shows a signal timing diagram illustrating transmission, from a UE through a network node to an AMF, of an indication of device capability for NR-U support, according to some embodiments.

In order for the core network (e.g. AMF 502 in FIG. 5) to store the UE capability information, that information needs to be provided to the core network. In some embodiments, the UE may communicate this capability to the network at an early communication stage with the network, e.g. during RRC connection establishment when the UE attaches to the network, and/or at a later time during network inquiry. In some embodiments, this capability of the UE may be provided to the network through other means (e.g. provided as programmed information, etc.) to store the UE-capability information at the network. As shown in FIG. 6, a UE 602 may transmit (at 608) to a base station/node 604, at an early communication stage with the network, e.g. over RRC connection establishment, or in response to a network inquiry, an indication of whether the UE has the capability to support standalone NR-U operation. The node 604 may then input this information (at 610) to the AMF 606.

Figure 7:
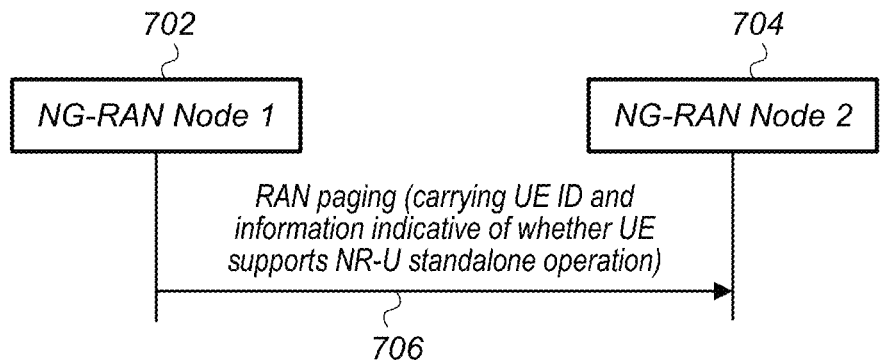
FIG. 7 shows a signal timing diagram illustrating transmission, from an anchor network node, of a RAN paging message that includes a UE ID and an indication of device capability for NR-U support, according to some embodiments.
Figure 8:
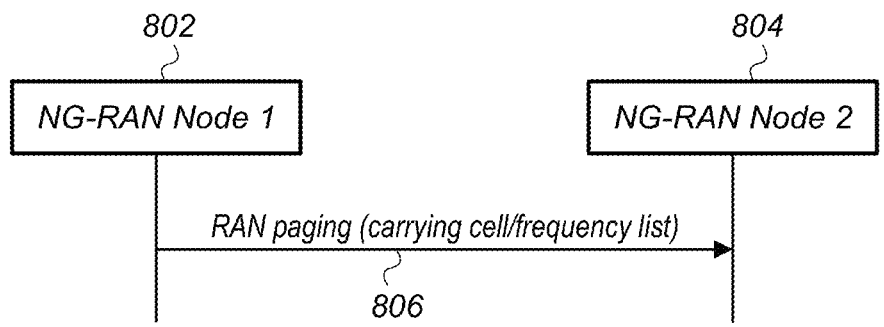
FIG. 8 shows a signal timing diagram illustrating transmission, from an anchor network node, of a RAN paging message that includes a cell/frequency list, according to some embodiments.
Figure 9:
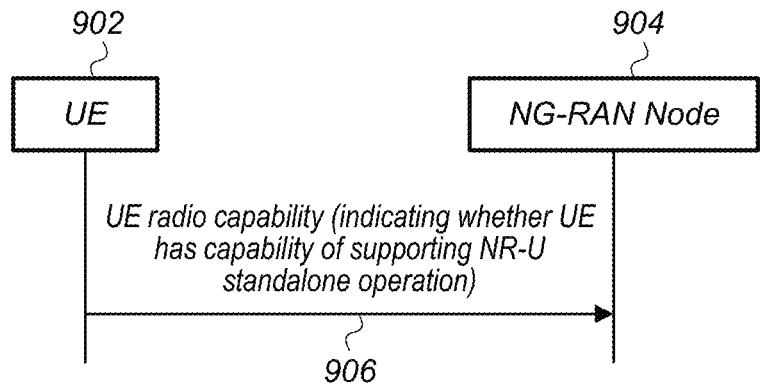
FIG. 9 shows a signal timing diagram illustrating transmission, from a UE to an anchor network node, of an indication of device capability for NR-U support, according to some embodiments.

The procedures described above may be used, for example, for paging UEs that are in an idle state. Further consideration may also be given to paging UEs that are in an inactive state. Thus, as shown in FIG. 7, in some embodiments, an anchor node (e.g. gNB) 702 may store information indicative of whether the UE has the capability of supporting NR-U standalone cell operation, and may include this information in a RAN paging message transmitted (at 706) to other nodes in the network, e.g. to node 704 (a single node is shown for simplicity). The RAN paging message(s) may also include the UE ID. Transmission of the paging message between node 702 and node 704 may take place over an interconnecting interface established between two nodes (two base stations or two gNBs), e.g. over the NR-C interface. For each UE that supports NR-U standalone cell operation, the anchor node 702 and other node(s) (704) may transmit the corresponding paging messages over the NR-U spectrum. For UEs that do not support NR-U standalone operation, the anchor node 702 and other node(s) 704 do not transmit the corresponding paging messages over the NR-U spectrum. In some embodiments, as illustrated in FIG. 8, instead of transmitting a RAN paging message as shown in FIG. 7, the anchor node 802 may determine a paging cell/frequency list within the RAN-based notification areas (RNA) based on the UE capability, and may forward the paging message (at 806) together with the cell/frequency list to other node(s) 804. The other node(s) 804 may then transmit the paging message accordingly. In order for the anchor node (e.g. nodes 702 and 802) to obtain the UE capability information, that information may be provided to the anchor node as illustrated in FIG. 9, for example. As shown in FIG. 9, the UE 902 may transmit (at 906) information indicative of the UE radio capability (indicating whether UE has capability of supporting NR-U standalone operation) to an anchor node 904. As previously mentioned with respect to idle-mode paging, the UE may provide this indication to the network at an early communication stage with the network, e.g. during RRC connection establishment when the UE attaches to the network, and/or in response to a network inquiry.

Standalone NR-U Paging

As described above, the network may be provided information indicative of whether the UE has the capability to support standalone NR-U operation, and the network may issue paging messages accordingly.

Figure 10:
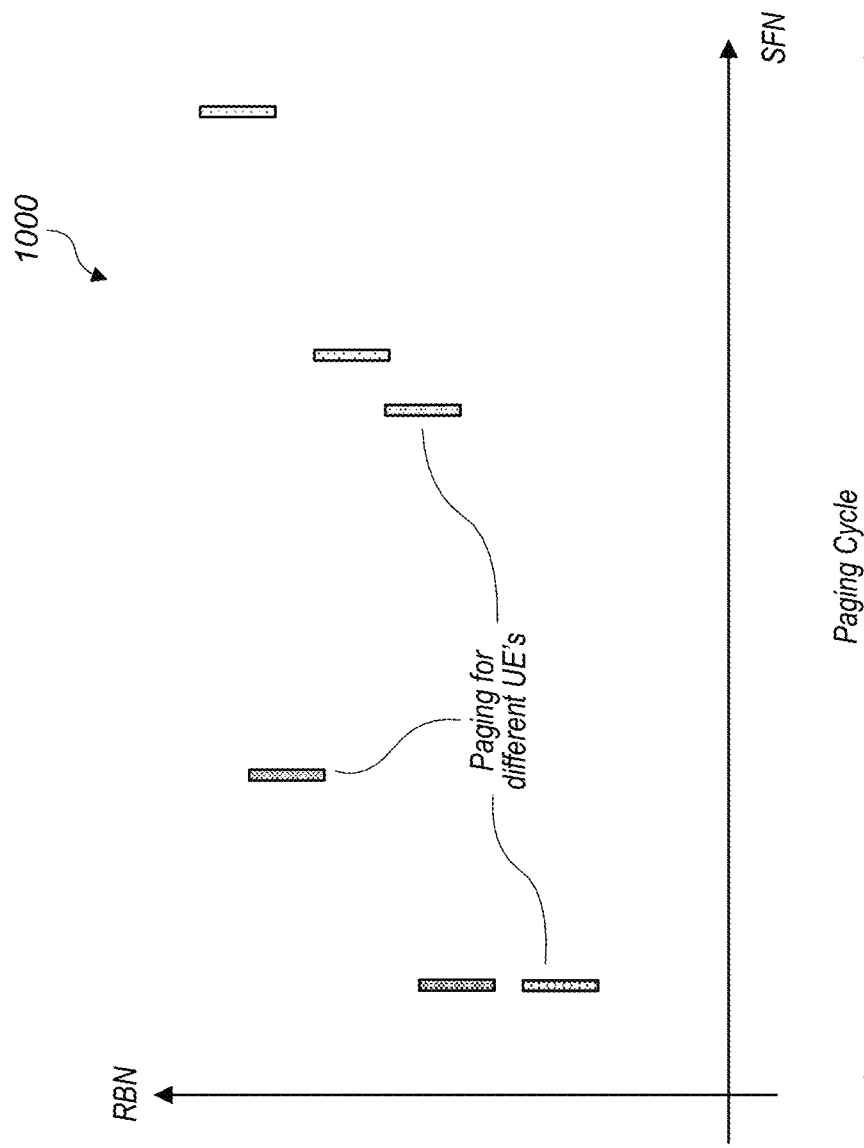
FIG. 10 shows a diagram illustrating the distribution of paging frames over available resource blocks.

Currently, sub-6 GHz NR systems may follow the same paging procedures as similar systems in LTE. In LTE, a paging occasion is calculated/determined based on the International Mobile Subscriber Identity (IMSI). There may be multiple paging occasions established/determined in an LTE system by/from a base station (e.g. eNB), taking all users in a cell into consideration. Paging messages are typically small, and paging occasions are generally spread over all paging cycles based on the UE-ID (IMSI). Each UE may have exactly one paging frame (10 ms) in any given paging cycle, as illustrated in diagram 1000 in FIG. 10. Diagram 1000 shows how paging frames may be distributed over available resource blocks (RBs), with the horizontal axis representing system frame numbers (SFNs), and the vertical axis representing RB numbers (RBNs). According to a typical calculation: Paging Frame=SFN mod T=(T/N)×(UE ID mod N), where from the perspective of a network node (e.g. eNB or gNB), every frame may be a possible paging frame. The paging frame may correspond to or include up to four (4) paging occasions (e.g. 4 subframes which may carry a paging message) but it is common to configure a single paging occasion through SIB-2.

In standalone unlicensed spectrum (NR-U), it is not efficient to spread paging messages across a paging cycle, as this may considerably decrease and/or compromise the system efficiency. In other words, spreading out small packets over a large time period may compromise the NR-U spectrum efficiency. For example, from the perspective of Listen Before Talk (LBT) procedures, spreading out the paging over all paging DRX cycles results in high traffic over the entire spectrum, which leads to higher LBT failures for the serving NR-U, other NR-U cells, as well as Wi-Fi access points in the spectrum. In an NR-U Time Division Duplex (TDD) system, it may not be possible to transmit UL transmissions when a node (e.g. a gNB) is transmitting paging messages. FIG. 11 shows a diagram 1100 illustrating possible POs from the perspective of the network node (e.g. eNB/gNB) with respect to multiple frames.

With autonomous uplink scheduling (AUL), the network provides a bit mask of subframes where AUL is possible. With the paging spread out over the spectrum, the network has to account for possible downlink subframes for paging purposes before assigning the AUL subframe bit mask. This is illustrated via diagrams 1200 and 1250 in FIG. 12.

Considering the PO shown in diagram 1200, the AUL bit mask (which may be a 40-bit mask) indicated in diagram 1250 needs to account for that PO.

Figure 13:
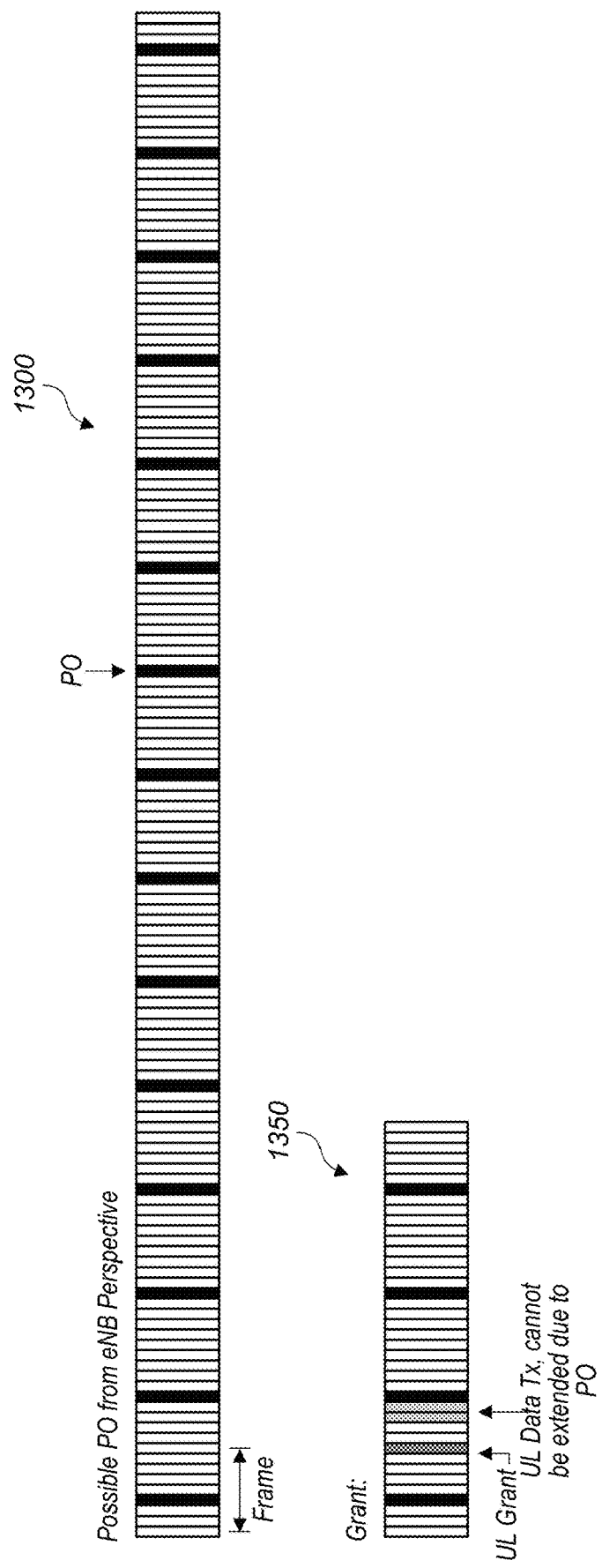
FIG. 13 shows diagrams illustrating possible paging occasions from the perspective of the network node and its effect on uplink continuous multi subframe transmissions.

Such paging methodology may also introduce performance issues with uplink continuous multi subframe transmissions. This is illustrated in diagrams 1300 and 1350 in FIG. 13. Similar to diagram 1200, diagram 1300 illustrates a PO from the perspective of the network node (e.g. eNB/gNB). Following the indicated UL grant in diagram 1350, the UL data transmission cannot be further extended due to the paging occasion. It is worth noting that UL communications generally include at least three transmissions, the transmission of the UL grant, the subsequent UL data transmission, and the corresponding acknowledgment (ACK).

Figure 14:
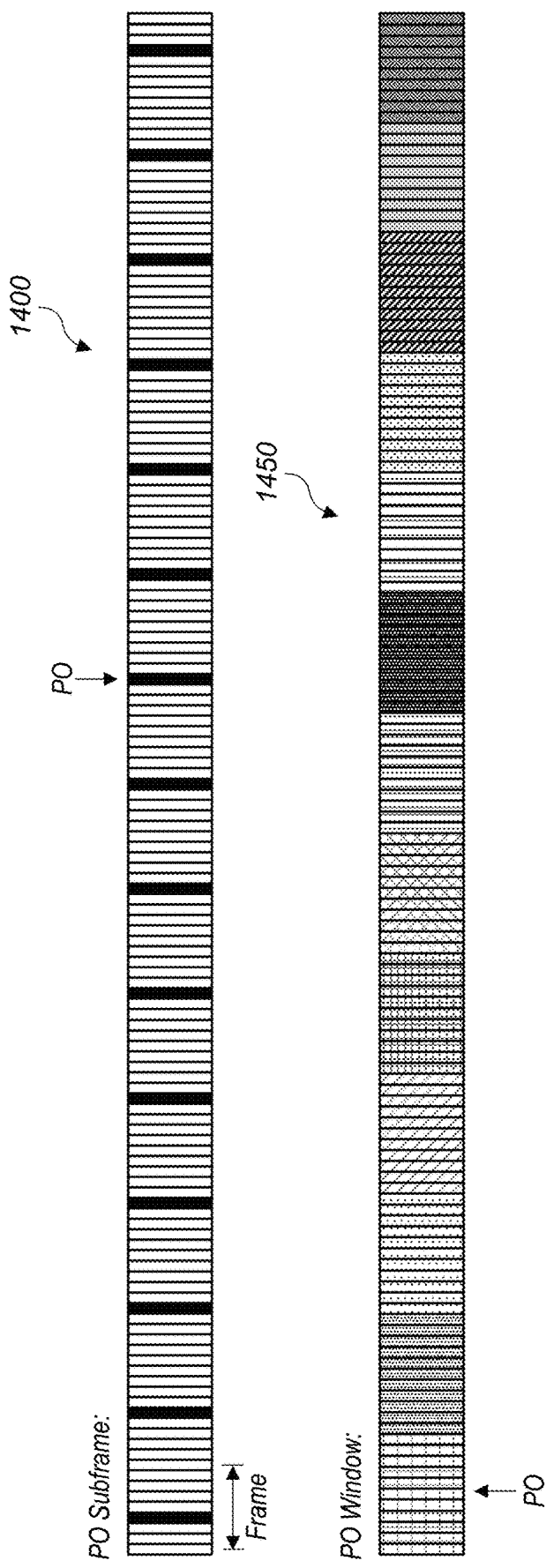
FIG. 14 shows diagrams illustrating subframe-based and windows-based paging cycles, respectively.

At least some of these performance issues may be mitigated by extending the PO subframe to a window-based approach in which a "paging window" is used in place of exact subframe-based paging occasions (POs). As shown in FIG. 14, the subframe-based PO indicated in diagram 1400 may be replaced with the window-based PO shown in diagram 1450. As shown in diagram 1450, each differently shaded area represents a paging window. A PO for a UE may occur during a given window, which may be monitored by the UE. If no paging messages for the UE are transmitted during that window, the UE may interpret the lack of paging messages as no paging having been intended for the UE, and may operate accordingly.

Figure 15:
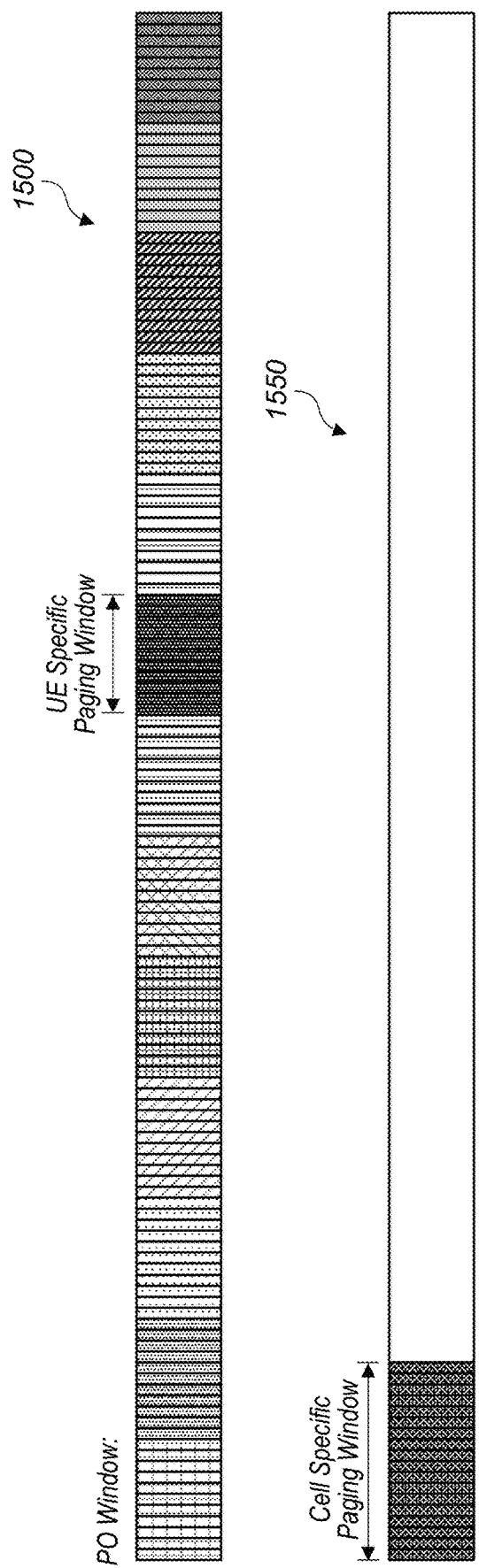
FIG. 15 shows diagrams illustrating device-specific paging windows and cell-specific paging windows, respectively, according to some embodiments.

A more detailed illustration of the window-based paging procedures is provided in diagram 1500 of FIG. 15. As illustrated in diagram 1500, NR-U paging messages for the UE's operating within the NR-U spectrum may be transmitted during multiple respective paging windows, with each paging window corresponding to a particular UE.

In order to introduce more flexibility, power savings and improve system efficiency, a novel window-based paging approach may be defined. In some embodiments, as shown in diagram 1550 of FIG. 15, NR-U paging messages for the UE's operating within the NR-U spectrum may be transmitted during a fixed paging window independent of the UE's ID. In other words, the UE-specific windows may be replaced by a cell-specific window as shown in diagram 1550, and all UEs may receive paging messages within that designated window. The window may be considered cell-specific insofar as it may be the designated window during which a given cell transmits paging messages to all UEs that are intended to receive (or are targeted to receive) paging messages and which are currently operating in the NR-U spectrum of the coverage area of the cell. For example, a paging window for a cell/sector may be configured from SFN mod DRX Cycle=0 (or 'N') to a paging window. It should be noted that while only a single cell-specific paging window is indicated on the timeline in diagram 1550, in some embodiments, multiple cell-specific paging windows may be implemented within a given time duration. While this approach improves system efficiency, it may still incur a power penalty on the UE, as each UE may still have to decode the P-RNTI for (during) the entire cell-specific paging window.

Therefore, to reduce power consumption, if there is no need for the base station (e.g. gNB) to transmit paging in a particular DRX cycle in a cell, the gNB may inform all UEs that no paging will be transmitted whenever it first passes the LBT check, allowing the UE to stop decoding P-RNTI and enter sleep mode (idle state). The gNB may provide the no-paging message to the UEs through an empty paging message or through specific downlink control information (DCI). If the gNB transmits a paging message, it may provide an "End-of-Paging (EOP)" indication in the current DRX cycle after transmitting the last paging information element (IE). The EOP indication may be used by the UEs that did not receive a paging message to enter into sleep mode (e.g. idle state or inactive state).

Since paging messages to all UEs for which paging messages are intended in the cell coverage area are transmitted during a single (time) window, UEs may be receiving paging messages during the same time period, and the chance for random access collisions may increase if more than one UE receives a paging message in a DRX cycle. To address this, in certain cases, for example for machine type (MT) RRC connections, the UE may follow a backoff mechanism before initiating a RACH procedure. Thus, in some embodiments, the UE may obtain a random time value, e.g. a time value between 0 and 100 ms, and start a timer using the obtained time value. In some embodiments, the timer may be started at the end of the paging window or upon receiving an EOP indication, while in other embodiments the timer may be started immediately after the UE receives a paging message that includes the UE's ID. Once the timer has expired, that is, once the time period of specified length defined by the obtained random time value has elapsed, the UE may initiate a RACH procedure.

A load analysis estimation based on an LTE system may be performed to provide an indication of how many UEs a system may accommodate when implementing cell-specific paging window procedures described above. For example, for full bandwidth transmission, with a system bandwidth of 20 MHz, QPSK modulation, and a typical paging message size of 6 Bytes per UE, for a lowest transport block (TB) size of 349 Bytes for 100 resource blocks (RB), the number of possible pages in 1 ms would be 349/6, i.e., corresponding to approximately 58 UEs. Assuming a 4 ms transmission after LBT, the number of possible pages in 4 ms may correspond to approximately 232 UEs. Assuming that each UE is paged once every 15 minutes on average, the number of UEs the system may accommodate would be approximately 163,125. This number may further increase as the network selects bigger transport block sizes even with QPSK.

In the case of 20% bandwidth utilization, for a lowest TB size of 67 Bytes for 20 resource blocks (RB) the number of possible pages in 1 ms would be 67/6, i.e., corresponding to approximately 11 UEs. Assuming a 4 ms transmission after LBT, the number of possible pages in 4 ms may correspond to approximately 44 UEs. Assuming that each UE is paged once every 15 minutes on average, the number of UEs the system may accommodate would be approximately 30,937. As can be observed, there is no paging latency increase, and the general NR paging latency is variable between 0 to paging DRX cycle length.

Topology Balance Considerations for Cell-Specific Paging Window Model

Unlicensed bands such as the 5.9 GHz bands may be deployed as small cells (e.g., with a coverage radius less than 500 meters). If there are limited number of small cells deployed in a paging area, there may be no issues with paging loading. If the paging area is relatively major, e.g. it contains both standard licensed NR cell deployments and standalone NR-U deployments, the network may preferably operate according to the UE-specific paging window model as opposed to the cell-specific paging window model. The network may inform the UE, e.g., through SIB-1, which paging model is deployed in that cell. The UE may adaptively select a paging scheme based on whether it is operating in a licensed or unlicensed cell. If the primary cell (PCell) is licensed, the UE-specific paging window model (procedure or cycle) may be followed. On the other hand, if the PCell is unlicensed, the UE may operate according to the cell-specific paging window model (procedure or cycle) by default. In that case the UE may operate according to the UE-specific paging window model (procedure or cycle) when explicitly instructed by the network, e.g. through the SIB.

Paging Formats

The paging messages may not be segmented. The RRC/MAC may choose to repeat paging for (at least) some of the UEs in multiple paging messages in a paging window, to improve time and frequency diversity. If the UE detects at least one paging message targeted to it, it may stop monitoring for further paging occasions in the (cell-specific) paging window. Because paging messages for all UEs (which are to receive paging messages within the coverage area of the cell) are consolidated in a cell-specific paging window, paging message size per TTI may increase.

Figure 16:
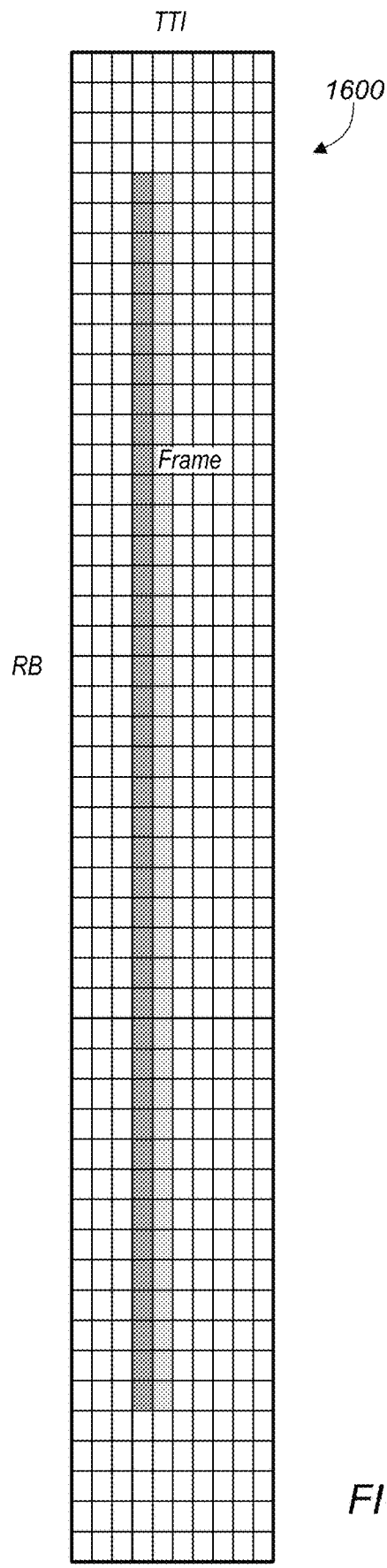
FIG. 16 shows a diagram illustrating a paging format for transmitting paging messages during cell-specific paging windows using one TB in a TTI, according to some embodiments.

FIG. 16 shows a diagram 1600 illustrating a paging format for transmitting paging messages during cell-specific paging windows using one TB in a TTI in a frame, according to some embodiments. As shown in FIG. 16, the rows in diagram 1600 represent resource blocks (RBs) while the columns represent transmit time intervals (TTIs). As shown in diagram 1600, one transport block (represented by a single color) may be used for paging in a TTI. The (network) RRC may provide one paging message per TTI to the (network) MAC.

Figure 17:
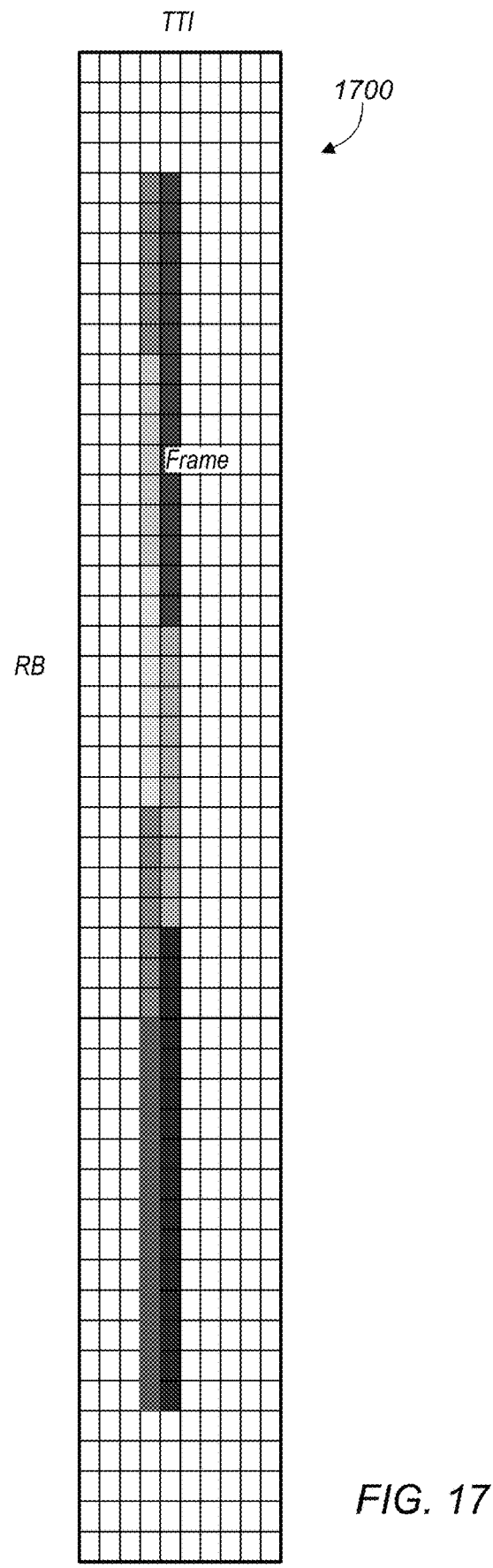
FIG. 17 shows a diagram illustrating a paging format for transmitting paging messages during cell-specific paging windows using multiple TBs in a TTI, according to some embodiments.

To increase reliability of paging reception (considering that the paging messages are consolidated, as noted above), the network may use multiple paging TBs in a TTI. FIG. 17 shows a diagram 1700 illustrating a paging format for transmitting paging messages during cell-specific paging windows using multiple TBs in a TTI in a frame, according to some embodiments. Similar to diagram 1600, the rows in diagram 1700 represent RBs while the columns represent TTIs. As shown in FIG. 17, multiple TBs (each represented by a different shading color) may be used for paging in a TTI. The (network) RRC may provide multiple paging messages to the (network) MAC per TTI, based on MAC-provided TB sizes.

Additional Considerations

The following considerations may also be taken into account with respect to standalone NR-U paging.

If the cell node (e.g. gNB) is not going to explicitly inform the UE that no paging is intended for or transmitted to that UE (in reference to the cell-specific paging window procedures detailed above), the UE may perform an LBT procedure, and if no transmission is detected in the entire first subframe of the cell-specific paging window, the UE may continue to operate under the assumption that no paging message has been transmitted for it in the current DRX cycle. As the UEs may be aware of the cell-specific paging window (or cell-specific paging occasion), they may not transmit during the first subframe of the cell-specific paging window regardless of AUL configurations. Accordingly, the gNB may also not transmit non-paging data in the first subframe of the cell-specific paging window.

If the UE-specific paging cycle is retained in NR-U deployment, a paging window may still be used. To reduce UE power consumption, it may be preferable for the UE to complete the paging procedure in one transmit time interval (TTI), and enter sleep mode. The UE may perform an LBT procedure, and if no transmission is detected in the first two symbols, the UE may continue to operate under the assumption that there was no paging message indented or transmitted for it in the current DRX cycle. Because such operation may be affected by a hidden node issue, the gNB may choose to enable this procedure through system information on selective cells. UE power consumption in idle mode may only increase by the power used during the "paging window" when contrasted with operation within a standard NR system. The overall system LBT mechanism may not be affected.

If the UE-specific paging cycle is retained in NR-U deployment, and a paging window is still used, the paging window start and end points may be selected/chosen as follows. The UE-specific paging occasion may be calculated as it is in a standard licensed NR system. The calculated paging occasion may then be adjusted based on the nearest earlier starting position of the Search Space block frame (SS-Block Frame). For example, the new paging frame may be established as follows: New Paging Frame=(PO Frame SFN)−((PO Frame SFN) Mod (SSB-Periodicity of Serving Cell)), where SSB refers to the Synchronization Signal Block. The new paging occasion starting point may then be established as: New Paging Occasion Start Point=New Paging Frame+Offset, where the offset may have a specified value obtained from a range of values, e.g. anywhere from 0ms to 5 ms, in some embodiments. The offset value may allow for the UE to complete the synchronization procedure in time for paging. For example, with a 5 ms offset, the UE may be able to complete the synchronization procedure before receiving paging. The New Paging occasion End point may be established as: New Paging Occasion Start Point+Paging Window. This may consolidate paging messages at SSB frames. It should also be noted that the EOP concept (previously described above) may be used, otherwise the network may need to transmit an EOP indication for every UE in every possible paging window. Again, UE power consumption in idle mode may only increase by the power used during the "paging window" when contrasted with operation within a standard licensed NR system. Furthermore, this selection process improves the overall system LBT mechanism, and may also be combined with the power use reduction technique described above to reduce overall UE power consumption.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processing element configured to cause a device to:
operate within a wireless cellular network;
provide, to the wireless cellular network, information indicating that the device has a capability to support operation within a standalone cell that serves a specified coverage area of the wireless cellular network for wireless cellular communications in a specified frequency band;
monitor, during a cell-specific paging window, paging messages transmitted by the standalone cell according at least in part to the information received by the wireless cellular network from the device, wherein the paging messages are transmitted within the cell-specific paging window to multiple devices operating within the standalone cell and targeted to receive corresponding paging messages;
enter a sleep mode when the monitoring indicates that the paging messages do not include a respective paging message intended for the device; and
process the respective paging message intended for the device when the monitoring indicates that the paging messages include the respective paging message intended for the device.

2. The apparatus of claim 1, wherein the paging messages transmitted by the standalone cell within the cell-specific paging window do not include paging messages for devices that have indicated to the wireless cellular network that they do not support operation within the standalone cell.

3. The apparatus of claim 1, wherein the processing element is configured to further cause the device to:
receive from the standalone cell an indication that no paging messages intended for the device will be transmitted by the standalone cell within a given transmission cycle; and
enter the sleep mode in response to receiving the indication from the standalone cell.

4. The apparatus of claim 3, wherein the processing element is configured to further cause the device to receive the indication through one of:
an empty paging message; or
specific downlink control information.

5. The apparatus of claim 1, wherein the processing element is configured to further cause the device to:
receive an end-of-paging (EOP) message from the standalone cell, wherein the EOP message indicates that the standalone cell has stopped transmitting paging messages within a given transmission cycle; and
enter the sleep mode in response to receiving the EOP message.

6. The apparatus of claim 1, wherein the processing element is configured to further cause the device to:
obtain a random time value;
start a timer based on the random time value; and
initiate a random access channel procedure upon expiration of the timer.

7. The apparatus of claim 6, wherein the processing element is configured to further cause the device to start the timer after one of:
an end of the cell-specific paging window; or
receiving the respective paging message intended for the device when the monitoring indicates that the paging messages include the respective paging message intended for the device.

8. A device comprising:
radio circuitry configured to facilitate wireless cellular communications of the device according to a specified radio access technology within a wireless cellular network served by a cell; and
a processing element communicatively coupled to the radio circuitry and configured to cause the device to:
provide, to the wireless cellular network, information indicating that the device has a capability to support operation within a standalone cell that serves a specified coverage area of the wireless cellular network for wireless cellular communications in a specified frequency band;
monitor, during a cell-specific paging window, paging messages transmitted by the cell according at least in part to the information received by the wireless cellular network from the device, wherein the paging messages are transmitted within the cell-specific paging window to multiple devices operating within standalone cell and targeted to receive corresponding paging messages;
enter a sleep mode when the monitoring indicates that the paging messages do not include a respective paging message intended for the device; and
process the respective paging message intended for the device when the monitoring indicates that the paging messages include the respective paging message intended for the device.

9. The device of claim 8, wherein the paging messages transmitted by the standalone cell within the cell-specific paging window do not include paging messages for devices that have indicated to the wireless cellular network that they do not support operation within the standalone cell.

10. The device of claim 8, wherein the processing element is configured to further cause the device to:
receive from the standalone cell an indication that no paging messages intended for the device will be transmitted by the standalone cell within a given transmission cycle; and
enter the sleep mode in response to receiving the indication from the standalone cell.

11. The device of claim 10, wherein the processing element is configured to further cause the device to receive the indication through one of:
an empty paging message; or
specific downlink control information.

12. The device of claim 8, wherein the processing element is configured to further cause the device to:
receive an end-of-paging (EOP) message from the standalone cell, wherein the EOP message indicates that the standalone cell has stopped transmitting paging messages within a given transmission cycle; and
enter the sleep mode in response to receiving the EOP message.

13. The device of claim 8, wherein the processing element is configured to further cause the device to:
obtain a random time value;

start a timer based on the random time value; and
initiate a random access channel procedure upon expiration of the timer.

14. The device of claim 13, wherein the processing element is configured to further cause the device to start the timer after one of:
an end of the cell-specific paging window; or
receiving the respective paging message intended for the device when the monitoring indicates that the paging messages include the respective paging message intended for the device.

15. A non-transitory memory element storing instructions executable by a processing element to cause a device to:
operate within a wireless cellular network;
provide, to the wireless cellular network, information indicating that the device has a capability to support operation within a standalone cell that serves a specified coverage area of the wireless cellular network for wireless cellular communications in a specified frequency band;
monitor, during a cell-specific paging window, paging messages transmitted by the cell according at least in part to the information received by the wireless cellular network from the device, wherein the paging messages are transmitted within the cell-specific paging window to multiple devices operating within the standalone cell and targeted to receive corresponding paging messages;
enter a sleep mode when the monitoring indicates that the paging messages do not include a respective paging message intended for the device; and
process the respective paging message intended for the device when the monitoring indicates that the paging messages include the respective paging message intended for the device.

16. The non-transitory memory element of claim 15, wherein the paging messages transmitted by the standalone cell within the cell-specific paging window do not include paging messages for devices that have indicated to the wireless cellular network that they do not support operation within the standalone cell.

17. The non-transitory memory element of claim 15, wherein the processing element is configured to further cause the device to:
receive from the standalone cell an indication that no paging messages intended for the device will be transmitted by the standalone cell within a given transmission cycle; and
enter the sleep mode in response to receiving the indication from the standalone cell.

18. The non-transitory memory element of claim 17, wherein the processing element is configured to further cause the device to receive the indication through one of:
an empty paging message; or
specific downlink control information.

19. The non-transitory memory element of claim 15, wherein the processing element is configured to further cause the device to:
receive an end-of-paging (EOP) message from the standalone cell, wherein the EOP message indicates that the standalone cell has stopped transmitting paging messages within a given transmission cycle; and
enter the sleep mode in response to receiving the EOP message.

20. The non-transitory memory element of claim 15, wherein the instructions are executable by the processing element to cause the device to:
obtain a random time value;
start a timer based on the random time value after one of:
an end of the cell-specific paging window; or
receiving the respective paging message intended for the device when the monitoring indicates that the paging messages include the respective paging message intended for the device; and
initiate a random access channel procedure upon expiration of the timer.

* * * * *